United States Patent
Bouvier

[11] Patent Number: 6,075,446
[45] Date of Patent: Jun. 13, 2000

[54] TANK WITH ALARM DEVICE

[75] Inventor: Daniel Bouvier, Paris, France

[73] Assignee: Compagnie Des Gaz De Petrole Primagaz, Paris, France

[21] Appl. No.: 09/284,893

[22] PCT Filed: Oct. 27, 1997

[86] PCT No.: PCT/FR97/01916

§ 371 Date: Apr. 22, 1999

§ 102(e) Date: Apr. 22, 1999

[87] PCT Pub. No.: WO98/19146

PCT Pub. Date: May 7, 1998

[30] Foreign Application Priority Data

Oct. 28, 1996 [FR] France .................................. 96 13121

[51] Int. Cl.[7] .................................................... G08B 21/00
[52] U.S. Cl. ............................................ 340/605; 73/42.2
[58] Field of Search .................................... 340/605, 641, 340/635; 73/40, 42.2 T

[56] References Cited

U.S. PATENT DOCUMENTS

| | | | |
|---|---|---|---|
| 4,850,223 | 7/1989 | Carlin et al. | 73/49.2 |
| 4,964,296 | 10/1990 | Jensen | 73/49.2 |
| 5,202,667 | 4/1993 | Alvin | 340/605 |
| 5,229,750 | 7/1993 | Welch, Jr. et al. | 340/605 |
| 5,988,945 | 11/1999 | Bouvier | 73/49.3 |

FOREIGN PATENT DOCUMENTS 2132767  7/1984  United Kingdom ........... G08C 19/00

*Primary Examiner*—Jeffery A. Hofsass
*Assistant Examiner*—Daniel Previl
*Attorney, Agent, or Firm*—Pearne, Gordon, McCoy & Granger LLP

[57] ABSTRACT

The invention concerns a tank with means for detecting its condition by sending signals to an alarm device emitting light signals, in which are provided means for converting the light signals of the alarm device into transformed signals capable of being recorded by a recording medium arranged for recording the transformed signals derived from the converting means.

13 Claims, 2 Drawing Sheets

U.S. Patent   Jun. 13, 2000   Sheet 1 of 2   6,075,446
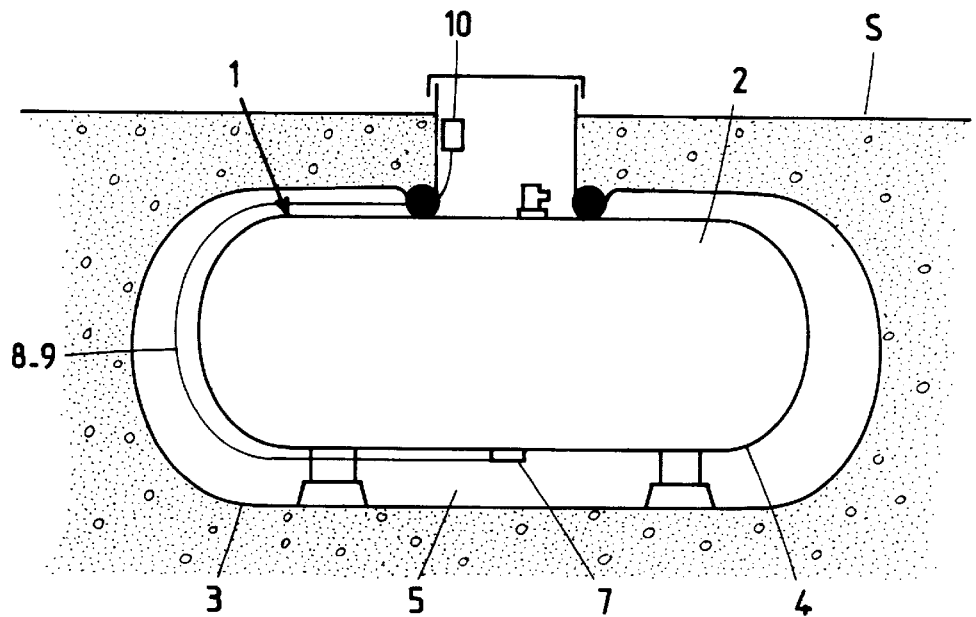
FIG_1
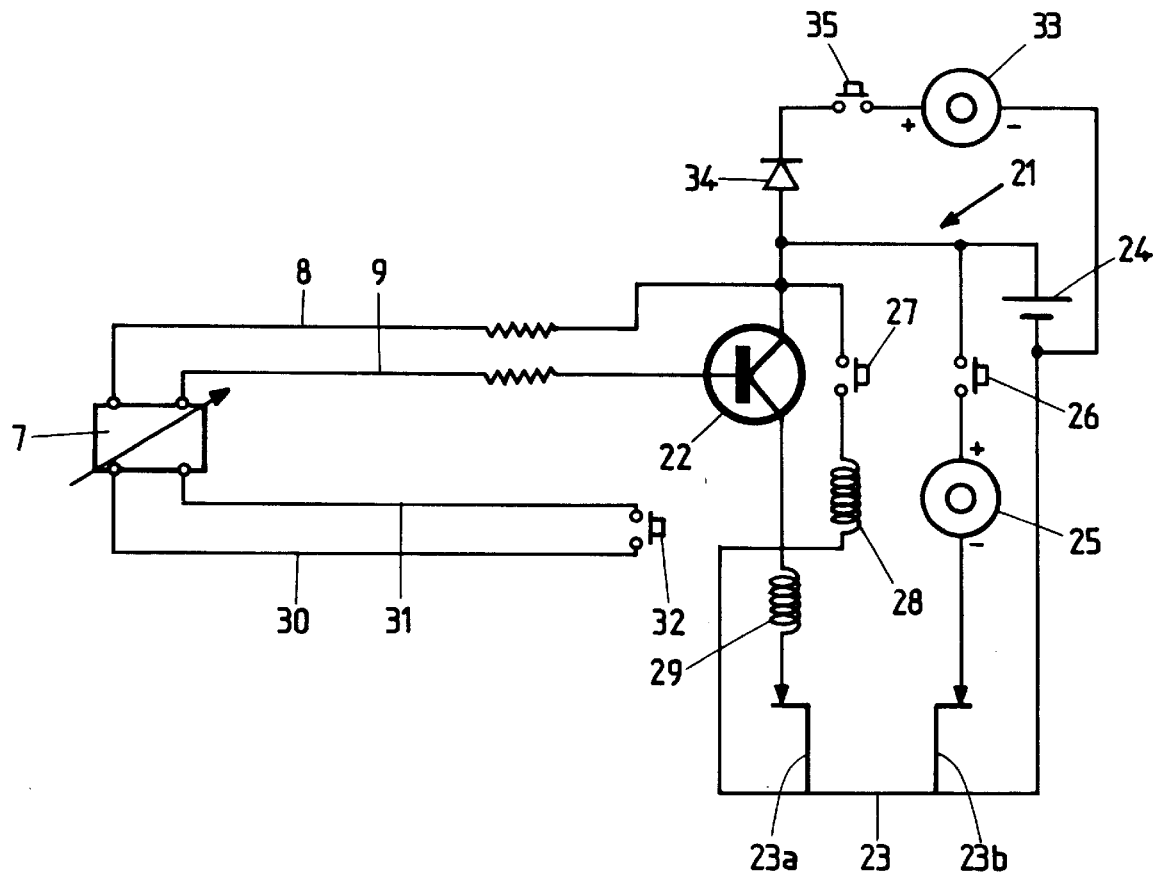
FIG_5

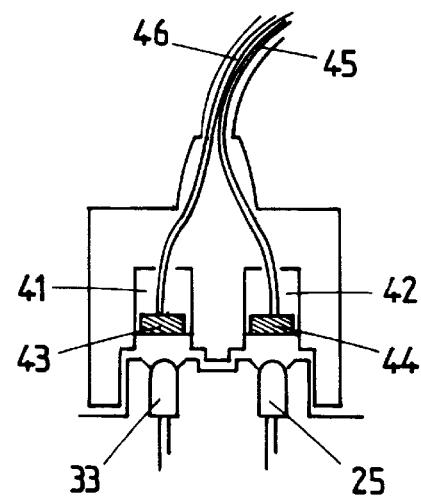
FIG_3
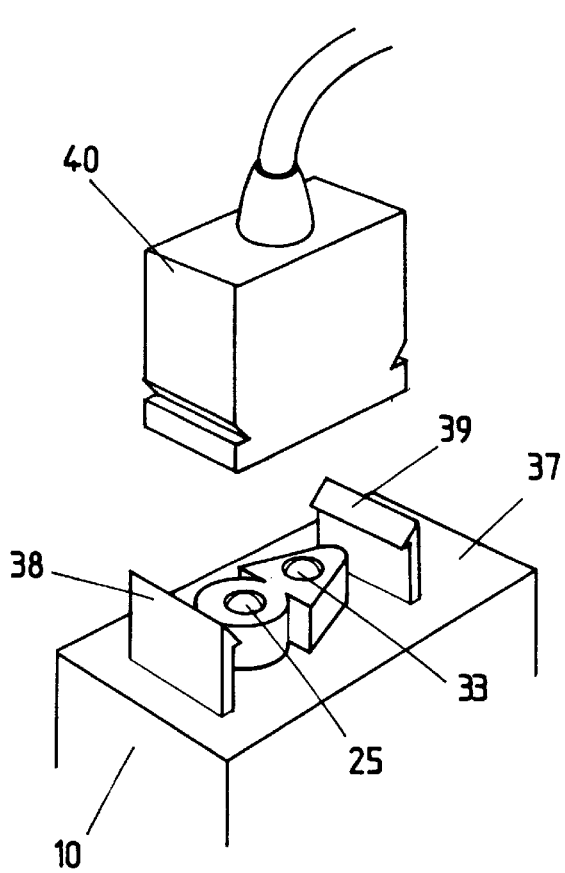
FIG_2
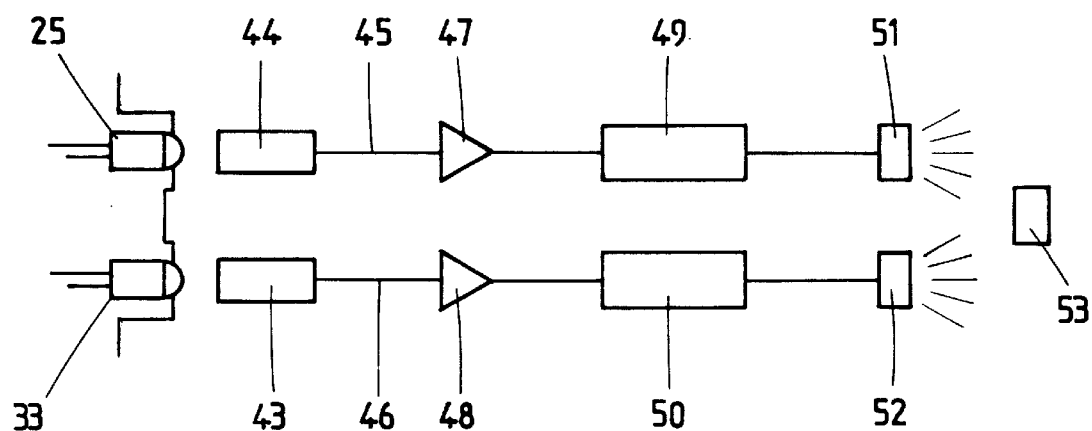
FIG_4

TANK WITH ALARM DEVICE

The present invention relates to a tank which comprises means for detecting its condition by sending signals to an alarm device, and notably means for detecting the presence of water over part of the outer surface of the container, or the satisfactory operation of the tank and especially of the detecting means. The present invention also relates to a process for monitoring the condition of a tank of this kind.

A detailed description of a tank of this kind is given in French patent application no. 94 15474 corresponding to the American application U.S. Ser. No. 08/574,446, included herein by reference.

When an attendant arrives to inspect the tank, light signals will indicate the condition of the tank. For example, where two pieces of information are provided by the alarm device and these two pieces of information are the appearance, or non-appearance, of water on the surface of the container and the proper operation or otherwise of the alarm device, a first light source, e.g. a lamp or photodiode, lights up if water has appeared and does not light up if it has not (or may show red in one case and green in the other) and a second light source lights up if the alarm device is defective and does not light up if it is not (or shows red in one case and green in the other, or any other way of presenting information by means of light signals).

These tanks of the prior art have the drawback that the recording of the data relating to their status depends on the reliability of the attendant who may, accidentally or otherwise, make mistakes. In fact, in the field of tanks and particularly buried tanks containing hydrocarbon gases, it is essential that the people in positions of superiority over the attendant can reliably monitor his work, as these other people will be held responsible in the event of a fatal error (gas leak leading to an explosion and human casualties).

The invention thus relates to a tank which allows reliable recording of the data relating to its condition, regardless of the reliability of the attendant, which is easier to carry out than the recordings made with tanks according to the prior art.

According to the invention, the tank, which comprises means for detecting its condition by sending signals to an alarm device emitting signals, is characterised by a recording medium which is incapable of recording the signals emitted by the alarm device, especially light signals, and by means for converting the signals emitted into transformed signals capable of being recorded by the recording medium, the latter being arranged so as to record the converted signals issuing from the conversion means.

By thus providing that the light signals will be converted into signals capable of being recorded, there is no longer any need for the operation of translation which had to be carried out by the attendant with the tanks according to the prior art, and the data can thus be recorded directly on the recording medium without the possibility of error committed by the attendant.

According to a preferred embodiment, the recordable signals are sound signals and the recording medium is a tape recorder. The attendant can thus add, to the data obtained from the tank itself, other data such as the owner's name and the date of the inspection, while the information obtained from the tank proves that the attendant has indeed made his inspection.

According to another advantageous embodiment, the alarm device comprises two sources, notably light sources, one providing a first type of data, e.g. information as to the appearance of condensation water on the outer surface of the container, and a second type of data, e.g. regarding the satisfactory operation of the alarm device itself. The conversion means may be frequency generating oscillators, each controlled by one of the light sources. Preferably, one frequency is assigned to the appearance of water and another frequency to the satisfactory operation of the electric circuit.

According to an improved feature of the invention, the recording medium and the conversion means form a unit which is separate from the rest of the tank. It is thus possible for the attendant's superiors to monitor his work at a distance from the tank.

The invention also relates to a process for checking a tank, comprising an alarm device which emits a signal representative of the state of the tank, characterised in that it comprises the steps of recording, in any order, on a recording medium, on the one hand, a signal, particularly a sound signal, which does not come from the alarm device, and, on the other hand, a signal, particularly a sound signal, coming from the alarm device, before every other recording relating to another tank and on the same recording medium.

In the accompanying drawings, which are given solely by way of example,

FIG. 1 is a section through a tank according to the invention,

FIG. 2 shows, on a larger scale, part of the tank in FIG. 1,

FIG. 3 is a sectional view of the interface between the photodiodes and the recording device, FIG. 4 shows a basic diagram of the recording device, FIG. 5 shows a diagram of the electric circuit of the tank.

The tank 1 comprises a container 2 the outer surface 4 of which is surrounded by a casing 3 to define a sealed enclosure 5. A water detector 7 is arranged on the bottom of the container 2, on its outer surface, and is connected by conductors 8,9 to an electric circuit 10. A detector 7 is described in detail in French patent application no. 94 15474 corresponding to American application U.S. Ser. No. 08/574 446 included herein by reference.

The electric circuit 10 is shown in FIG. 5.

The conductor 8 is connected to the base of a transistor 22, the emitter of which is connected to a first branch 23a of a bistable relay 23 having two positions NF and NO. This branch 23a of the bistable relay is connected by an electric lead, on the one hand to a terminal of a source of electric current 24 and on the other hand to the other branch of the bistable relay 23b having two positions NF and NO. The latter branch is connected by an electric lead to a lamp 25, which is in turn connected to a reed switch 26 ILS, which is in turn connected to the collector of the transistor 22. The second terminal of the electric current source 24 is also connected to the collector of the transistor 22. A branch comprising a resetting reed switch 27 ILS and an auxiliary coil 28 is mounted between [sic] the terminal of the electric current source which is also connected to the bistable relay 23. The coil 29 forms part of the bistable relay 23.

Two other conductors 30, 31 are mounted at the terminals of the detector 7 and connected, after passing through the casing 3 in leaktight manner, by a checking reed switch 32 ILS.

Moreover, at the terminals of the current source 24, is mounted a series arrangement consisting of a lamp 33, a Zener photodiode 34 and a switch 35 ILS.

Under normal conditions (when no water appears) no current passes through the conductors 8, 9.

If water appears in the detector 7, a passage of current follows, which goes into the base of the transistor 22. The current comes out amplified from the emitter of the transistor and goes into the first branch 23A, with two bistable states, of the bistable relay which then changes from the state NF (closed) allowing current to pass through, to the state NO (open) which prevents current from passing through. The current which has just passed into the first branch of the bistable relay also enters the second branch 23B of the bistable relay, which changes from the state NO to the state NP. The circuit comprising the electric current source 24, the lamp 25 and the manual switch 26 is then completed and current passes into the lamp 25 if the switch 26 is closed. By closing the switch 26, the user thus establishes:

if the lamp is emitting light, that current has passed between the electrodes since the last time the bistable relay 23 was in its normal position (branch A closed, branch B open) (generally the previous inspection);

if the lamp is not emitting light and emits light when the checking switch 32 is closed, that no current has passed through since the last time the bistable relay was placed in the normal position.

The switch 32 short-circuits the electrodes and enables the current to pass between them. By closing this switch, the user can check that the electric data circuit 10 is operating normally, if the lamp 25 is emitting light. If it is not emitting light, this means that there is a fault in the electric circuit 10 (defective cable, defective components, etc) and intervention is required.

Moreover, by closing the switch 35, the lamp 33 is lit up if the voltage of the current source 24 is greater than a value given by the Zener photodiode 34 and hence if the current source 24 is in good condition.

Once these checks have been made, the user reopens the switch 26 ILS and closes the resetting switch 27 ILS for a moment, to return the bistable relay to its normal position, whilst supplying the auxiliary coil 29 of the relay.

When the monitoring attendant arrives to monitor a tank, he inserts a magnetic key along a precise path which actuates, in sequence:

1) the switches ILS 35 and 26, the movement of the switch 35 into the closed position having the effect of lighting the lamp 33 if the battery 24 is sufficiently charged and the movement of the switch 26 into the closed position causes the lamp 25 to light up if condensation has occurred, however temporarily, which has caused the bistable relay to flip over, 2) the switch 27 which resets the bistable relay to its waiting position. The two lamps do not light up.

3) the switch 32 which, by short-circuiting the detector, makes it possible to check that the electric circuit is working properly, notably to check that the connecting cables of the detector of the circuit are sound.

The key has then reached the end. As it is withdrawn it reactivates the switch 27, which resets the relay to the waiting position, then actuates the switches 35 and 26, causing the lamp 33 to light up and, if there has been permanent condensation or dampness on the detector, causes the lamp 26 to light up.

Thus, during the travel of the magnetic key over the path mentioned above, the two lamps will successively light up or not and thus provide data as to the state of the tank.

If all is working properly (no condensation, battery charged and electric circuit reliable) the lamp 33 lights up then goes out, whilst the lamp 25 will remain unlit, then the lamp 25 will light up and go out while the lamp 33 remains unlit and finally the lamp 33 will light up again then go out, while the lamp 25 will remain unlit.

If a fault has occurred, e.g. condensation, but the circuit and battery are in good order, the sequence will be as follows:

Light emitted by both lamps simultaneously, then both will go out, then the lamp 25 will come on on its own, then go out, then both lamps will come on and go out.

FIG. 2 shows the interface between the electric circuit 10 and the recording medium (not shown) used by the attendant.

The electric circuit 10 is enclosed in a housing 37 on which are mounted two protuberances 38 and 39 which allow the connecting housing 40 to be removably attached by snap-fitting, thus providing the connection between the electric circuit 10 and the recording medium. The electric circuit is arranged so that the two lamps 25 and 33 are located on the upper outer surface of the housing 37, two openings being provided in this upper part of the housing to accommodate the two lamps.

FIG. 3 shows a cross section of the connecting housing 40. Provided in the connecting housing 40 are two channels 41 and 42 which are aligned above the two lamps in the position where the housing 40 is snap-fitted on the housing 37. In these two channels are two photodiodes 43 and 44, each of which is connected by conductors 45, 46 to the recording device.

FIG. 4 shows a basic diagram of the recording device. Each photodiode 43, 44 is connected to an amplifier 47, 48 which is connected to a sound frequency generating oscillator 49, 50 connected to a speaker 51, 52 (or buzzer). A miniature tape recorder 53 is arranged so as to record the sound signals from the speakers 51, 52.

When a lamp 25 or 36 is illuminated, the associated photodiode 43, 44 creates a current amplified by the amplifier 47, 48 which is transmitted to the sound frequency generating oscillator 49, 50, the speaker 51,52 then emitting a sound signal recorded by the miniature tape recorder 53.

The sound frequency generating oscillators 49, 50 are selected so that each emits its own frequency. Here, the oscillator 49 generates a continuous frequency at 3,000 Hz, whereas the oscillator 50 generates a cutoff frequency at 26,500 Hz.

Thus, each sequence of lighting up and going out of the lamps 25 and 33 will have a corresponding sequence of sound frequencies which will enable the person listening to the recording to be aware of the information emitted in the form of light signals by the lamps 25 and 33 during the movement of the magnetic key which activates the switches according to the sequence described hereinbefore.

Before inserting the magnetic key, the attendant may speak the number of the tank, its whereabouts and the date into the tape recorder. Then he inserts the magnetic key and the miniature tape recorder records the sound sequence corresponding to the condition of the tank in question. The attendant then moves on to another tank.

Another possibility is to provide a plurality of other lamps or photodiodes activated by an ILS reed switch, which is in turn activated by the magnetic key, these additional lamps or photodiodes being illuminated or not, in order to supply a sequence of light signals characteristic of the lamp, whilst this sequence can be translated into sound in the same way as described above with the aid of additional oscillators which emit sounds such as, for example, "tank number such-and-such" and "the date is . . . ", etc. making the system even more independent of the attendant.

What is claimed is:

1. A tank in combination with means for detecting a tank condition by sending signals to an alarm device emitting light signals, comprising a data recording medium which is incapable of recording the signals emitted by the alarm device, and conversion means for converting the light signals into converted signals capable of being recorded by the data recording medium, said data recording medium recording the converted signals emitted by the conversion means.

2. The combination of claim 1, wherein said converted signals comprise sound signals and said data recording medium comprises a tape recorder.

3. The combination of claim 1, wherein said alarm device includes two light sources for emitting said light signals for two different types of data.

4. The combination of claim 3, wherein said two different types of data comprise condensation data relating to condensation on an exterior surface of said tank and operability data relating to the operability of said alarm device.

5. The combination of claim 3, wherein said conversion means comprise frequency generating oscillators.

6. The combination of claim 5, wherein said frequency generating oscillators provide a first sound frequency signal in response to said first type of data and a second sound frequency signal in response to said second type of data.

7. The combination of claim 1, wherein the data recording medium and the conversion means are remote of said tank.

8. The combination of claim 2, wherein said alarm device includes two light sources for emitting said light signals for two different types of data.

9. The combination of claim 8, wherein said conversion means comprise frequency generating oscillators.

10. The combination of claim 9, wherein said frequency generating oscillators provide a first sound frequency signal in response to said first type of data and a second sound frequency signal in response to said second type of data.

11. The combination of claim 10, wherein the data recording medium and the conversion means are remote of said tank.

12. A method of monitoring a tank having an alarm device for emitting light signals corresponding with a tank condition to be monitored, comprising the steps of converting said light signals into converted signals, providing a data recording medium capable of recording said converted signals and capable of recording signals which do not come from the alarm device, but not said light signals, and recording said converted signals to thereby monitor and record said tank condition.

13. The method of claim 12, wherein the step of converting said light signals into converted signals comprises converting said light signals into sound signals.

* * * * *